United States Patent
Zhang

(10) Patent No.: US 11,410,153 B1
(45) Date of Patent: Aug. 9, 2022

(54) ENROLLING MOBILE-PAYMENT CUSTOMERS AFTER ONLINE TRANSACTIONS

(71) Applicant: Block, Inc., San Francisco, CA (US)

(72) Inventor: Songmin Zhang, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/051,317

(22) Filed: Jul. 31, 2018

(51) Int. Cl.
*G06Q 20/00* (2012.01)
*G06Q 20/32* (2012.01)
*G06F 8/61* (2018.01)

(52) U.S. Cl.
CPC ........... *G06Q 20/3223* (2013.01); *G06F 8/61* (2013.01); *G06Q 20/327* (2013.01); *G06Q 20/3227* (2013.01)

(58) Field of Classification Search
CPC ...... G06Q 20/341; G06Q 20/381; G06F 8/70; H04L 67/12
USPC .......................................................... 705/42
See application file for complete search history.

(56) References Cited

U.S. PATENT DOCUMENTS

| | | | |
|---|---|---|---|
| 7,403,922 B1 * | 7/2008 | Lewis | G06Q 10/0635 705/38 |
| 7,958,027 B2 | 6/2011 | Lawrence | |
| 7,958,029 B1 * | 6/2011 | Bobich | G06Q 40/025 705/40 |
| 8,296,206 B1 | 10/2012 | Del Favero et al. | |
| 8,380,129 B2 | 2/2013 | Mizani | |
| 8,412,605 B2 | 4/2013 | Griffin et al. | |
| 8,566,227 B2 | 10/2013 | Carroll et al. | |
| 8,572,391 B2 | 10/2013 | Golan et al. | |
| 8,612,352 B2 | 12/2013 | Dorsey et al. | |
| 8,662,389 B2 | 3/2014 | Dorsey et al. | |
| 8,750,901 B1 | 6/2014 | Gupta et al. | |
| 8,788,410 B1 | 7/2014 | Locasto et al. | |
| 8,818,907 B2 | 8/2014 | Bonalle et al. | |
| 9,171,306 B1 | 10/2015 | He et al. | |
| 9,224,142 B2 | 12/2015 | Lamba et al. | |
| 9,262,777 B2 | 2/2016 | Babu et al. | |
| 9,280,772 B2 | 3/2016 | Baldwin et al. | |
| 9,286,635 B2 | 3/2016 | Lamba et al. | |
| 9,305,314 B2 | 4/2016 | Babu et al. | |
| 9,373,112 B1 | 6/2016 | Henderson et al. | |
| 9,460,427 B2 * | 10/2016 | Fassiotto | G06Q 20/0425 |

(Continued)

OTHER PUBLICATIONS

Secure and Quick NFC payment with data mining and intelligent fraud detection (Year: 2017).*

(Continued)

*Primary Examiner* — Bruce I Ebersman
(74) *Attorney, Agent, or Firm* — Lee & Hayes, P.C.

(57) ABSTRACT

Techniques described herein are directed to, among other things, enabling the use of contactless payment technology when customers and merchant are remote from one another by, for example, authorizing merchants to use payment hardware components residing on customer devices. For example, when a customer requests to purchase an item from a merchant via a ecommerce page of the merchant, a payment-processing service may authorize, at the request of the customer, the merchant to use an NFC reader residing on the customer device to accept payment information from a contactless card of the customer for satisfying a cost of the transaction.

18 Claims, 7 Drawing Sheets

(56) References Cited

U.S. PATENT DOCUMENTS

| | | |
|---|---|---|
| 9,485,265 B1 | 11/2016 | Saperstein et al. |
| 9,489,672 B1 | 11/2016 | Poole et al. |
| 9,495,676 B2 | 11/2016 | Lamba et al. |
| 9,576,289 B2 | 2/2017 | Henderson et al. |
| 9,626,679 B2 | 4/2017 | Bhorania et al. |
| 9,727,869 B1 | 8/2017 | Matson et al. |
| 9,754,255 B1 | 9/2017 | Ma et al. |
| 9,811,825 B2 | 11/2017 | Hopkinson |
| 9,811,830 B2 | 11/2017 | Cowan |
| 9,842,334 B1 | 12/2017 | Magi et al. |
| 9,916,581 B2 | 3/2018 | Dorsey et al. |
| 9,916,619 B2 | 3/2018 | Nuzzi |
| 10,037,532 B2 | 7/2018 | Birukov et al. |
| 10,127,501 B2 | 11/2018 | Grigoryan et al. |
| 10,198,731 B1 | 2/2019 | Spindel et al. |
| 10,275,772 B2 | 4/2019 | Ronca et al. |
| 10,320,569 B1* | 6/2019 | Wentz .................. G06F 21/645 |
| 10,332,110 B2 | 6/2019 | Patel et al. |
| 10,334,060 B1 | 6/2019 | Weldon |
| 10,346,845 B2 | 7/2019 | Sherlock et al. |
| 10,354,251 B1 | 7/2019 | Gailloux et al. |
| 10,354,252 B1 | 7/2019 | Sahar et al. |
| 10,510,065 B2 | 12/2019 | Benkreira et al. |
| 10,600,055 B2* | 3/2020 | Durney .................. H04L 63/08 |
| 2004/0215574 A1 | 10/2004 | Michelsen et al. |
| 2004/0230527 A1* | 11/2004 | Hansen .................. G06Q 20/02 |
| | | 705/40 |
| 2005/0262013 A1 | 11/2005 | Guthner et al. |
| 2008/0033775 A1 | 2/2008 | Lydon et al. |
| 2008/0183622 A1* | 7/2008 | Dixon ................ G06Q 20/0855 |
| | | 705/44 |
| 2008/0222706 A1 | 9/2008 | Renaud et al. |
| 2009/0276257 A1 | 11/2009 | Draper et al. |
| 2010/0114773 A1 | 5/2010 | Skowronek |
| 2010/0317420 A1* | 12/2010 | Hoffberg ............ G06Q 30/0207 |
| | | 463/1 |
| 2011/0270757 A1 | 11/2011 | Hammad |
| 2011/0320293 A1 | 12/2011 | Khan |
| 2012/0094639 A1 | 4/2012 | Carlson et al. |
| 2012/0095852 A1* | 4/2012 | Bauer ................ G06Q 20/3223 |
| | | 705/16 |
| 2012/0143706 A1* | 6/2012 | Crake .................. G06Q 20/36 |
| | | 705/18 |
| 2012/0179558 A1* | 7/2012 | Fischer .................. G06Q 20/20 |
| | | 705/16 |
| 2012/0239557 A1 | 9/2012 | Weinflash et al. |
| 2012/0244885 A1 | 9/2012 | Hefetz |
| 2013/0054412 A1 | 2/2013 | Brendell et al. |
| 2013/0132275 A1 | 5/2013 | Enzaldo et al. |
| 2013/0185180 A1 | 7/2013 | Zhou et al. |
| 2013/0275332 A1* | 10/2013 | Bennett ................ G06Q 20/102 |
| | | 705/36 R |
| 2013/0326606 A1 | 12/2013 | Kelly et al. |
| 2014/0074655 A1 | 3/2014 | Lim et al. |
| 2014/0114852 A1* | 4/2014 | Rajagopal .............. G06Q 30/06 |
| | | 705/44 |
| 2014/0156433 A1* | 6/2014 | Hills .................. G06Q 20/4037 |
| | | 705/21 |
| 2014/0207679 A1* | 7/2014 | Cho ...................... H04L 51/046 |
| | | 705/44 |
| 2014/0263625 A1 | 9/2014 | Smets et al. |
| 2014/0279540 A1 | 9/2014 | Jackson |
| 2014/0365341 A1* | 12/2014 | MacLaurin ........ G06Q 30/0635 |
| | | 705/26.81 |
| 2015/0033286 A1 | 1/2015 | Shahidzadeh et al. |
| 2015/0081522 A1* | 3/2015 | Shinar .................... G06Q 20/10 |
| | | 705/38 |
| 2015/0134540 A1* | 5/2015 | Law ........................ G06Q 20/02 |
| | | 705/72 |
| 2015/0220929 A1* | 8/2015 | Monk .................... G06Q 10/06 |
| | | 705/13 |
| 2015/0269580 A1 | 9/2015 | Subramanian et al. |
| 2015/0348042 A1 | 12/2015 | Jivraj et al. |
| 2016/0239818 A1* | 8/2016 | Laracey ................ G06Q 20/405 |
| 2016/0267469 A1 | 9/2016 | Somani et al. |
| 2016/0283942 A1 | 9/2016 | Chitragar et al. |
| 2016/0292783 A1* | 10/2016 | Nair ...................... G06Q 40/025 |
| 2016/0343100 A1 | 11/2016 | Davenport et al. |
| 2017/0070484 A1* | 3/2017 | Kruse ................ H04L 63/0442 |
| 2017/0083985 A1 | 3/2017 | Lacoss-Arnold et al. |
| 2017/0098216 A1* | 4/2017 | Studnitzer ............ G06Q 20/383 |
| 2017/0098217 A1* | 4/2017 | Studnitzer .............. G06Q 20/08 |
| 2017/0180339 A1 | 6/2017 | Cheng et al. |
| 2017/0193514 A1 | 7/2017 | Chen |
| 2017/0206604 A1* | 7/2017 | Al-Masoud ............ G06Q 40/04 |
| 2017/0300903 A1 | 10/2017 | Mori et al. |
| 2017/0300911 A1 | 10/2017 | Alnazem et al. |
| 2017/0318000 A1* | 11/2017 | Louis ...................... H04L 63/08 |
| 2018/0005315 A1 | 1/2018 | Rines |
| 2018/0020039 A1* | 1/2018 | Loeb ...................... H04L 67/02 |
| 2018/0039975 A1 | 2/2018 | Hefetz |
| 2018/0040064 A1* | 2/2018 | Grigg .................... H04L 41/147 |
| 2018/0082303 A1 | 3/2018 | Chan-bauza et al. |
| 2018/0182472 A1 | 6/2018 | Preston et al. |
| 2019/0050766 A1 | 2/2019 | Barday et al. |
| 2019/0050853 A1* | 2/2019 | Kumar .................. G06Q 20/4014 |
| 2019/0050861 A1 | 2/2019 | Venkatesh et al. |
| 2019/0114643 A1 | 4/2019 | Dewitt et al. |
| 2019/0122149 A1 | 4/2019 | Caldera et al. |
| 2019/0172129 A1 | 6/2019 | Bhattacharjee et al. |
| 2019/0206569 A1 | 7/2019 | Shelton et al. |
| 2019/0266594 A1 | 8/2019 | Ali |
| 2019/0272549 A1 | 9/2019 | Mossoba et al. |
| 2020/0380481 A1* | 12/2020 | Kalaboukis .......... G06Q 20/384 |

OTHER PUBLICATIONS

Applying QR Code in Mobile Banking Use (Year: 2021).*
Non-Final Office Action dated Aug. 20, 2019, for U.S. Appl. No. 16/024,543, of Childress, A, et al., filed Jun. 29, 2018.
Non-Final Office Action dated Mar. 23, 2020, for U.S. Appl. No. 16/051,285, of Zhang, S., et al., filed Jul. 31, 2018.
Final Office Action dated Apr. 20, 2020, for U.S. Appl. No. 16/024,543, of Childress, A., et al., filed Jun. 29, 2018.
Non-Final Office Action dated Apr. 20, 2020, for U.S. Appl. No. 16/024,584, of Childress, A, et al., filed Jun. 29, 2018.
Advisory Action dated Jun. 22, 2020, for U.S. Appl. No. 16/024,543, of Childress, A., et al., filed Jun. 29, 2018.
Final Office Action dated Aug. 10, 2020, for U.S. Appl. No. 16/051,285, of Zhang, S., et al., filed Jul. 31, 2018.
Final Office Action dated Aug. 27, 2020, for U.S. Appl. No. 16/024,584, of Childress, A., et al., filed Jun. 29, 2018.
Non-Final Office Action dated Feb. 10, 2021, for U.S. Appl. No. 16/051,285, of Zhang, S., et al., filed Jul. 31, 2018.
Advisory Action dated Sep. 2, 2021, for U.S. Appl. No. 16/051,285, of Zhang, S., et al., filed Jul. 31, 2018.
Final Office Action dated Jun. 28, 2021, for U.S. Appl. No. 16/051,285, of Zhang, S., et al., filed Jul. 31, 2018.
Non-Final Office Action dated Dec. 3, 2021, for U.S. Appl. No. 16/051,285, of Zhang, S., et al., filed Jul. 31, 2018.

* cited by examiner

ENROLLING MOBILE-PAYMENT CUSTOMERS AFTER ONLINE TRANSACTIONS

BACKGROUND

In today's commerce more and more transactions between customers and merchants occur online or otherwise outside of brick-and-mortar locations of the merchants. As such, the process for completing these transactions has continued to evolve. Similarly, some brick-and-mortar merchants have recently begun moving away from large, stationary point-of-sale (POS) devices and towards the use of smaller, portable POS devices. In addition to the above, the technology of payment instruments and payment channels used in these transactions have also advanced. This advancement in technology continue to expand the possibilities for connecting merchants and customers in commerce.

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1:
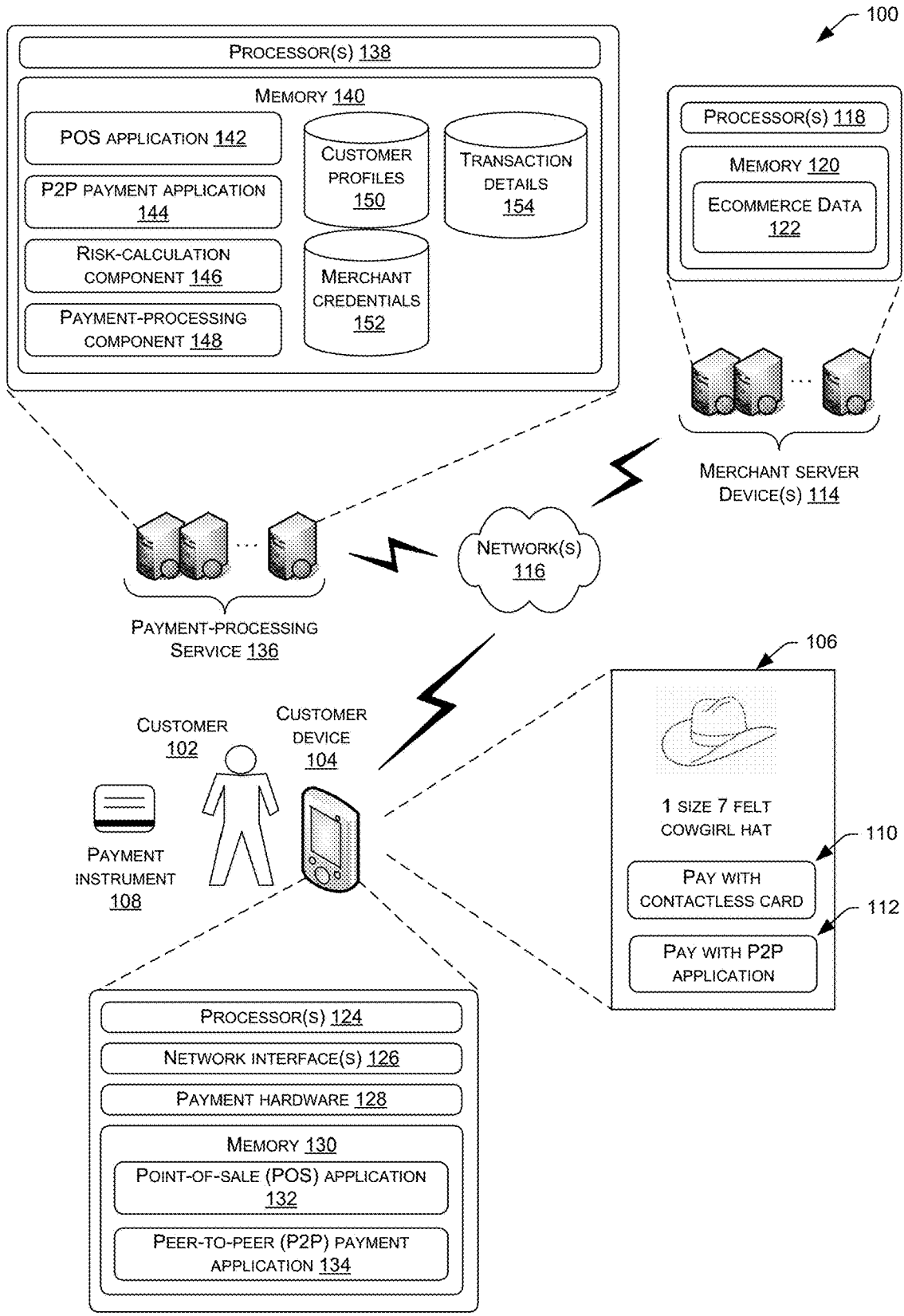
FIG. 1 illustrates an example architecture that includes a customer operating a customer device to purchase an item via an ecommerce page of a merchant. In one example, the customer may use payment hardware, such as an NFC reader, on the customer device to provide payment information associated with a payment instrument of the customer, such as a contactless card, to a payment-processing service for satisfying a cost of the transaction. In another example, the payment-processing service may enable the customer to satisfy the cost of the transaction using a peer-to-peer (P2P) payment application before the customer has either installed or registered with the application.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

As described above, the process for completing payment transactions between customers and merchants continues to evolve. For example, recent developments allow customers to pay for items at brick-and-mortar locations of merchants using contactless payment cards of the customer. To enable this technology, the merchants utilize near-field-communication (NFC) readers communicatively coupled to merchant devices to receive payment information (e.g., card number, expiration date, etc.) from the contactless cards via NFC. That is, when a customer wishes to pay for an item at a physical location of a merchant using a contactless card of the customer, the customer simply taps his or her card against the NFC reader, which retrieves the payment information from the contactless card and passes this information to the merchant device. The merchant device then passes a request to authorize the contactless card and the payment information to a payment-processing service, which attempts to authorize the card for the cost of this transaction.

While this technology reduces the friction between the customer and the merchant during the checkout process, its use is limited to brick-and-mortar merchants. That is, because the NFC reader is owned and operated by the merchant, a customer wishing to pay with his or her contactless card must be in close proximity of the merchant to use his or her contactless card. As such, a customer is unable to pay a merchant for an item using the contactless technology of a contactless card of the customer when the customer is remote from the merchant, such as when the customer is operating a customer device to purchase an item from an ecommerce page of the merchant.

However, techniques described herein are directed to, among other things, enabling the use this contactless technology when customers and merchant are remote from one another by, for example, authorizing merchants to use payment hardware components residing on customer devices. For example, envision that a customer uses a customer device to browse an ecommerce page of a merchant, and that the customer requests to purchase an item from the merchant via the ecommerce page. Traditionally, the ecommerce page would allow the user to satisfy a cost of the transaction by typing in a credit-card number, paying with a third-party service (e.g., PayPal, etc.), or the like. In this instance, however, the ecommerce page may display an indication that the customer may pay with his or her contactless card.

Upon receiving a customer selection of the indication to pay with the contactless card, the customer device may send an indication of the selection to a server computing device associated with the merchant and/or a server computing device associated with a payment-processing service that facilitates transactions between customers and merchants. Upon receiving the indication, the server computing device may retrieve credentials associated with the merchant for authorizing the merchant to use payment hardware (e.g., an NFC reader) residing on the customer device. For example, the server computing device may retrieve a username/password combination associated with the merchant, may generate a token for authorizing the merchant to take control of the payment hardware, and/or other login information for enabling the merchant to use the payment hardware. The server computing may then send this login information to the customer device.

Upon receiving the login information from the server computing device, the customer device may, essentially, login to the NFC reader as the merchant. That is, the customer device may use the login information to authorize the merchant to use the NFC reader for completing the transaction. In some instances, the login information may be associated with an expiration time such that the merchant is authorized to use the NFC reader for a predetermined amount of time, such as a few minutes or the like. In addition, or in the alternative, the login information may be associated with a particular transaction and, thus, may authorize the merchant use the NFC reader for the transaction associated with the request of the customer, but not for subsequent transactions.

In either instance, upon the customer device authorizing the merchant to use the NFC reader, the customer device may output a request (e.g., visually, audibly, etc.) to the customer to tap his or her contactless card to the customer device. Upon the contactless card coming into a threshold proximity of the NFC reader of the customer device, the NFC reader may retrieve payment information associated with the card. The customer device may then send this information, potentially along with the login information or other identifying information, back to the server device or another server device associated with the payment-processing service. The payment-processing service may then use the received payment information to attempt to authorize the contactless card for the cost of the transaction.

The above techniques thus solve the existing problem of the inability of customers to use contactless payment technology in instances where the customers are remote from physical merchant locations. That is, these techniques enable merchants to temporarily provision NFC readers on customer devices for merchant use to effectively turn the customer device into a merchant device for a limited period of time, thus closing the distance between the customer and the (temporary) merchant device.

These and other techniques are described in further detail below. Further, while some of the examples discussed herein are described with reference to NFC readers and contactless cards, it is to be appreciated that the techniques may apply equally to other payment-hardware components residing on customer devices. For example, customer devices may include card readers into which payment instruments and dipped or swiped, and the techniques for authorizing merchants to temporarily take control of payment hardware may apply equally to these card readers.

In addition, given that merchants are able to temporarily take control of payment hardware on customer devices using the techniques described herein, in some instances these techniques may be further leveraged to increase security of online transactions. For example, the techniques may be used to identify fraudulent purchase requests such that the requests are denied. For example, in response to a POS application executing on customer device sending a request to initiate payment using payment hardware of the customer device, login information of the merchant may be sent to the customer device for enabling the payment hardware for use by the merchant. In addition, code may be sent or otherwise executed on the client device for analyzing contents of the customer device to determine whether the customer device, and hence the payment hardware, has been compromised. If so, then the code may send an instruction to the payment-processing service and/or the merchant indicating that the request is fraudulent and requesting to to refrain from consummating the transaction.

The techniques described herein are also directed to, among other things, enabling customers to purchase items from merchants using mobile payment applications (e.g., peer-to-peer (P2P) payment applications) prior to the customers having installed these applications on their respective devices and/or registering with the payment applications. As described above, payment technologies continue to advance and, as part of these advancements, customers and merchants are able to transfer money between one another's accounts (e.g., bank accounts, etc.) using mobile payment applications that are linked to these respective accounts. For example, a first user may transfer funds from his or her bank account to a bank account of another user or a merchant using a mobile payment application installed on his or her mobile device. However, a user is typically unable to take advantage of these applications until he or she has downloaded an instance of the application onto his or her mobile device and registered with the application by, for example, linking an account (e.g., a bank account) of the user to the mobile application.

As described below, however, a user may be able to purchase an item from a merchant using a mobile payment application prior to downloading the application onto his or her device and/or prior to registering with the application. For example, a customer may use his or her customer device to navigate to an ecommerce page of a merchant. Upon requesting to purchase one or more items from the merchant, the ecommerce page may display an indication that the user is able to purchase the item(s) using a mobile payment application. Upon receiving a selection of the indication, the customer device and/or a server computing device associated with a payment-processing service may determine whether the customer device has installed the application and/or whether the customer has registered with the mobile payment application (e.g., whether the user has linked a bank account to the application). If so, then the customer may complete the transaction by transferring funds from the linked customer account to an account of the merchant. In some instances, the payment-processing service may facilitate this transfer.

If, however, mobile payment application is not available because, either because the customer device does not store an instance of the application or the customer has not registered with the application, then the payment-processing service may determine whether to nevertheless complete the transaction on behalf of the customer and thereafter request that the customer reimburse the payment-processing service. For example, the payment-processing service may perform a risk analysis on the customer and/or the transaction to calculate a risk. If this risk score is greater than a risk threshold, the payment-processing service may refrain from paying the merchant on behalf of the customer and, thus, the customer may download and/or register with the application or may choose to pay for the item(s) using another payment method. If, however, the risk score is less than the risk threshold, then the payment-processing service may transfer first funds equal to the cost of the item (plus tax, shipping, etc.) from an account of the payment-processing service to the merchant account to complete the transaction.

Thereafter, the payment-processing service may send a request to the customer device requesting that the customer download the application and/or register with the application. Upon the customer device downloading the application and/or linking an account to the application, the mobile payment application may transfer second funds, in an amount equal to or otherwise based on an amount of the first funds, from the linked customer account to the payment-processing service account.

Using the above techniques, customers are therefore able to utilize mobile payment applications, such as P2P payment applications, to complete transactions with merchants, even prior to the customers downloading instances of the applications to their devices and/or registering with these applications. Similar to the techniques described above with reference to authorizing merchants to use NFC readers residing on customer devices, this payment technology thus provides additional ways in which customers may transact with merchants outside of brick-and-mortar establishments.

Examples of these techniques are described below with reference to FIGS. 1-7. It is to be appreciated, however, that the following description and examples are merely illustrative and that the techniques may apply in other environments and architectures.

FIG. 1 illustrates an example architecture 100 that includes a customer 102 operating a customer device 104 to purchase an item via an ecommerce page 106 of a merchant. In one example, the customer 102 may use payment hardware, such as an NFC reader, on the customer device 104 to provide payment information associated with a payment instrument 108 of the customer 102, such as a contactless card, to a payment-processing service for satisfying a cost of the transaction. As illustrated, in this example the ecommerce page 106 includes an icon 110 that, when selected, allows the customer 102 to purchase the illustrated item using the payment hardware, such as the NFC reader, of the customer device 104. In another example, the payment-processing service may enable the customer to satisfy the cost of the transaction using a peer-to-peer (P2P) payment application before the customer has either installed or registered with the application. Also illustrated, in this example the ecommerce page 106 includes an icon 112 that, when selected, allows the customer 102 to purchase the item using the P2P payment application.

FIG. 1 further illustrates one or more merchant server devices 114 associated with the merchant, with which the customer device 104 may communicate with over a network 116. As illustrated, the merchant server devices 114 may include one or more processors 118 and memory 120, which may store ecommerce data 122. The merchant server devices may generate one or more ecommerce pages, such as the ecommerce page 106, using the ecommerce data 122. As used herein, an ecommerce page may include any type of visual and/or audible content rendered on the customer device 104 or other devices, including content displayed on a webpage, content displayed on a merchant-provided application, or the like.

The customer device 104 may also include one or more processors 124, one or more network interfaces 126, one or more pieces of payment hardware 128, and memory 130. The payment hardware 128 may include an NFC reader configured to receive payment information from a contactless card via NFC, a card reader configured to receive payment information from a payment card via a swipe or dip, and/or the like. The memory 130 may store or otherwise have access to an instance of a point-of-sale (POS) application 132 and/or an instance of a P2P payment application 134. The POS application 132 may comprise an application that is configured to facilitate a transaction between the customer 102 and a merchant via a payment-processing service 136. That is, the POS application 132 may be configured to receive, from the payment hardware 128, payment information associated with a payment instrument and provide this payment information and one or more transaction details associated with the transaction the payment-processing service 136. The payment-processing service 136 may thereafter attempt to authorize the payment instrument for the cost of the transaction. In some instances, the customer 102 may utilize the POS application 132 to operate as a merchant, while in other instances the customer 102 may utilize the POS application 132 to complete a transaction as a customer with a merchant, as described in detail below.

The P2P payment application 134, meanwhile, may facilitate the transfer of funds from one or more accounts of the customer 102 to one or more accounts of other users and/or merchants. In some instances, the customer 102 may be able to acquire an item from a merchant prior to downloading and/or registering with the P2P payment application, as described in further detail below.

Figure 3:
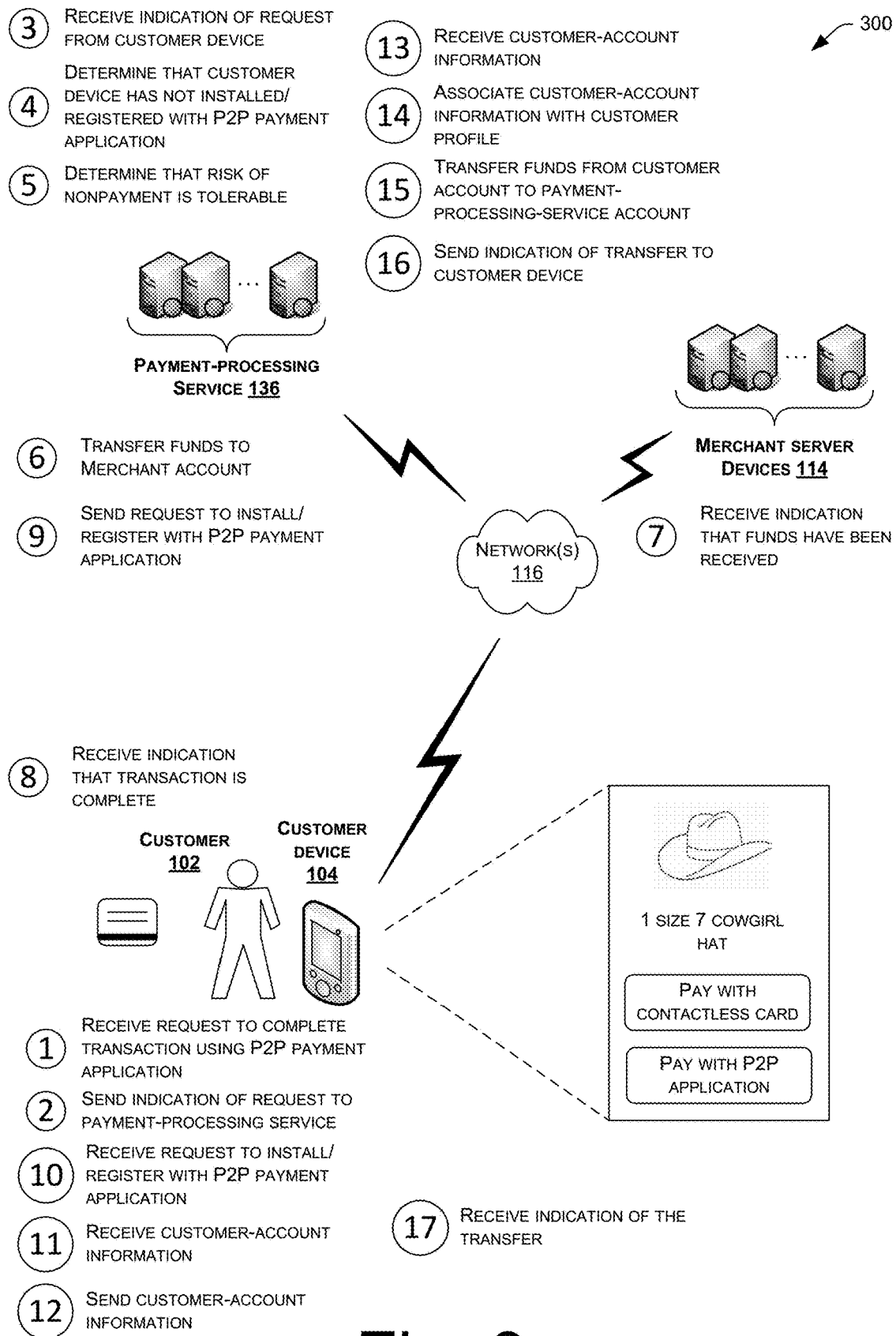
FIG. 3 illustrates an example within the architecture of FIG. 1 where the customer requests to satisfy the cost of the transaction using the P2P payment application prior to the customer installing an instance of the application or otherwise registering with the application. In this example, the payment-processing service pays the merchant on behalf of the customer, before requesting that the customer install or register with the P2P payment application and thereafter reimburse the payment-processing service for the cost of the transaction.
Figure 6:
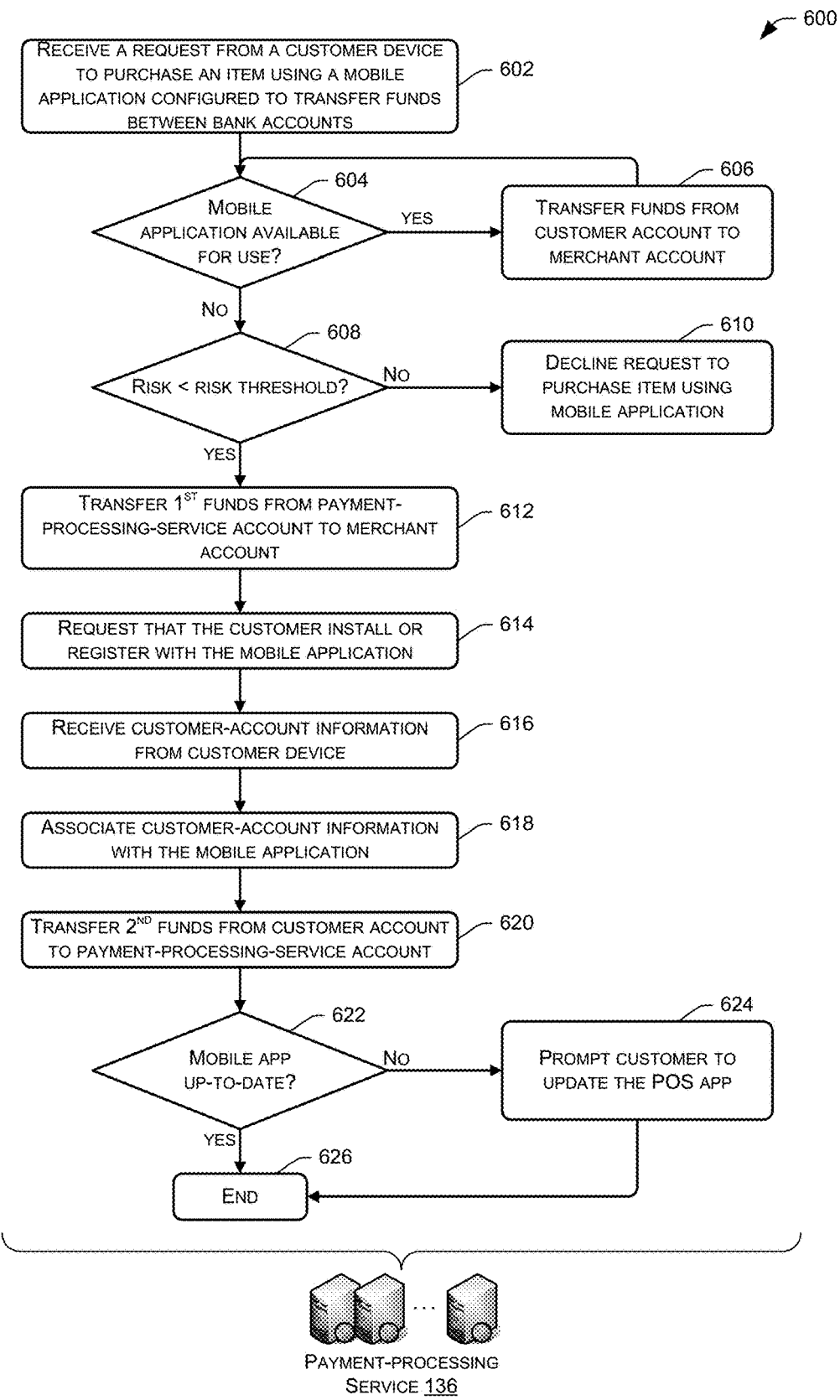
FIG. 6 illustrates an example process that the payment-processing service may implement in response to a customer requesting to complete a transaction using a P2P payment application prior to the customer installing or registering with the application.

The payment-processing service 136, meanwhile, may function to facilitate transactions between customers and merchants, such as between the customer 102 and the merchant 114. The payment-processing service 136 can be implemented by one or more servers computing devices that include one or more processors 138 and memory 140. The memory 140 may store the POS application 142, the P2P payment application 144, a risk-calculation component 146, and a payment-processing component 148. The payment-processing component 148 may function to receive requests to authorize transactions from merchants and/or customers and, in response, may use received payment information to attempt to authorize the transactions. The risk-calculation component 146, meanwhile, may function to determine a risk associated with a particular customer and/or transaction and determine whether to front the cost of a transaction on behalf of a customer. FIGS. 3 and 6 and their corresponding discussion describe operation of the risk-calculation component 146 in further detail.

The memory 140 may also store or otherwise have access to one or more customer profiles 150, merchant credentials 152, and transaction details 154. The payment-processing service 136 may use the customer profiles when determining how to process a transaction. For example, the payment-processing service 136 may reference a customer profile associated with the illustrated customer 102 for determining whether the customer 102 has installed an instance of the P2P payment application on a corresponding device, for calculating a risk score associated with a particular customer or transaction of the customer, and/or the like. The merchant credentials 152, may be used for authorizing a merchant, such as the merchant 114 to operate payment hardware of a particular customer device, such as the payment hardware 128 of the customer device 104. For instance, the merchant credentials 152 may comprise username/password pairs, generated tokens, and/or other types of login information that may be used to enable payment hardware on a customer device to operate on behalf of a corresponding merchant. Finally, the transaction details 154 may correspond to information associated with a transaction, such as a cost of the transaction, item(s) being purchased as part of the transaction, payment information used to satisfy a cost of the transaction, an identity of a user and/or merchant associated with the transaction, and/or the like.

Within the architecture 100 of FIG. 1, the customer 102 may use the customer device 104 to navigate to the ecommerce page 106. From the page 106, the customer 102 may request to purchase an item, such as the illustrated hat in this example. In one instance, the customer may select the icon 110 to request to purchase the item from the merchant 114 using a contactless card of the customer 102. In response to selecting this icon 110, in some instances code operating on the customer device 104 may determine whether the POS application 132 is available for use (e.g., whether the customer device 104 has installed the application 132 and/or whether the user has registered with the application 132). If not, then the code on the customer device may prompt the customer 102 to install and/or register with the POS application 132.

However, if the code determines that the POS application 132 is available for use, then the code may send an indication of the request the payment-processing service 136. In some instances, the indication may include details associated with the transaction, such as an identity of the merchant, an identity of the item(s) being purchased, an identity of the customer 102 and/or device 104, a cost of the item(s), and/or the like. In response to receiving the indication, the payment-processing service 136 may retrieve login credentials associated with the identified merchant, in this instance merchant 114. This may include, for example, generating a token and storing an indication that the generated token is associated with this particular transaction. Regardless of the particular type of login information being used, the payment-processing service 136 may send the login information to the customer device 104.

Figure 2:
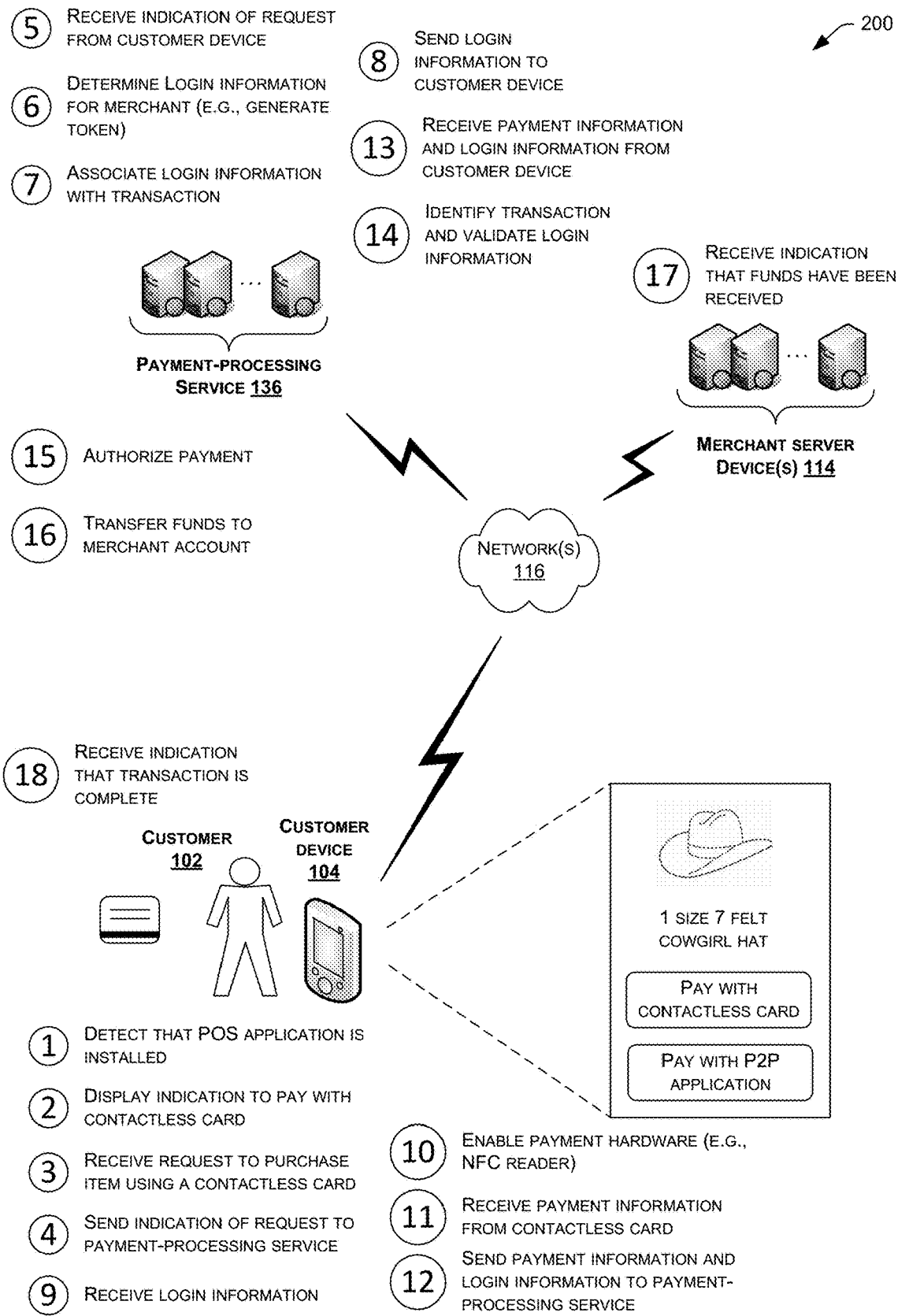
FIG. 2 illustrates an example within the architecture of FIG. 1 where the customer device enables its payment hardware (e.g., an NFC reader) on behalf of the merchant such that the payment hardware is able to receive payment information from a payment instrument of the customer (e.g., a contactless card) for satisfying a cost of the transaction.
Figure 4:
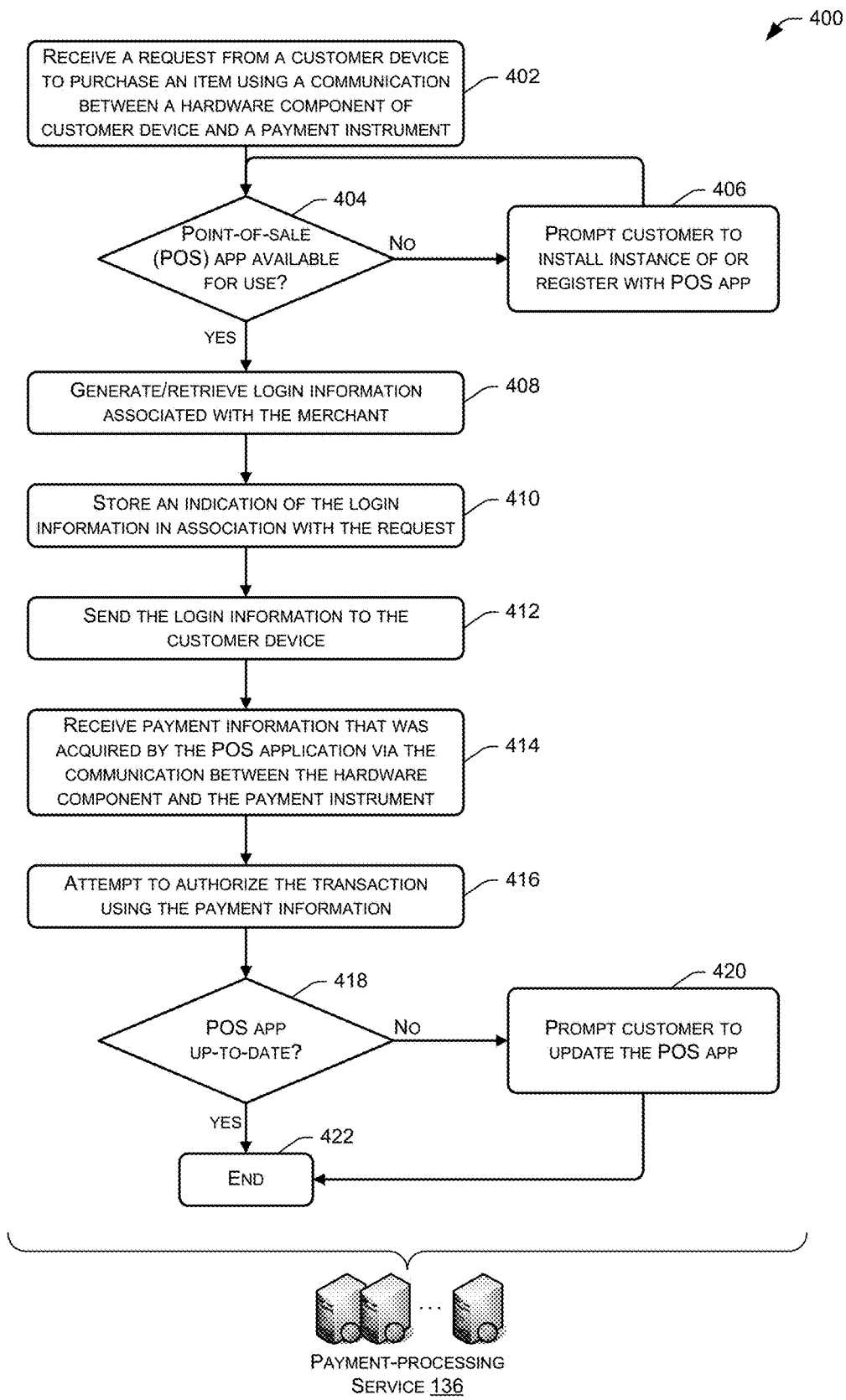
FIG. 4 illustrates an example process that the payment-processing service may implement for causing a customer device to enable its payment hardware for receiving payment information from a payment instrument of a customer for satisfying a cost of a transaction between the customer and a merchant.
Figure 5:
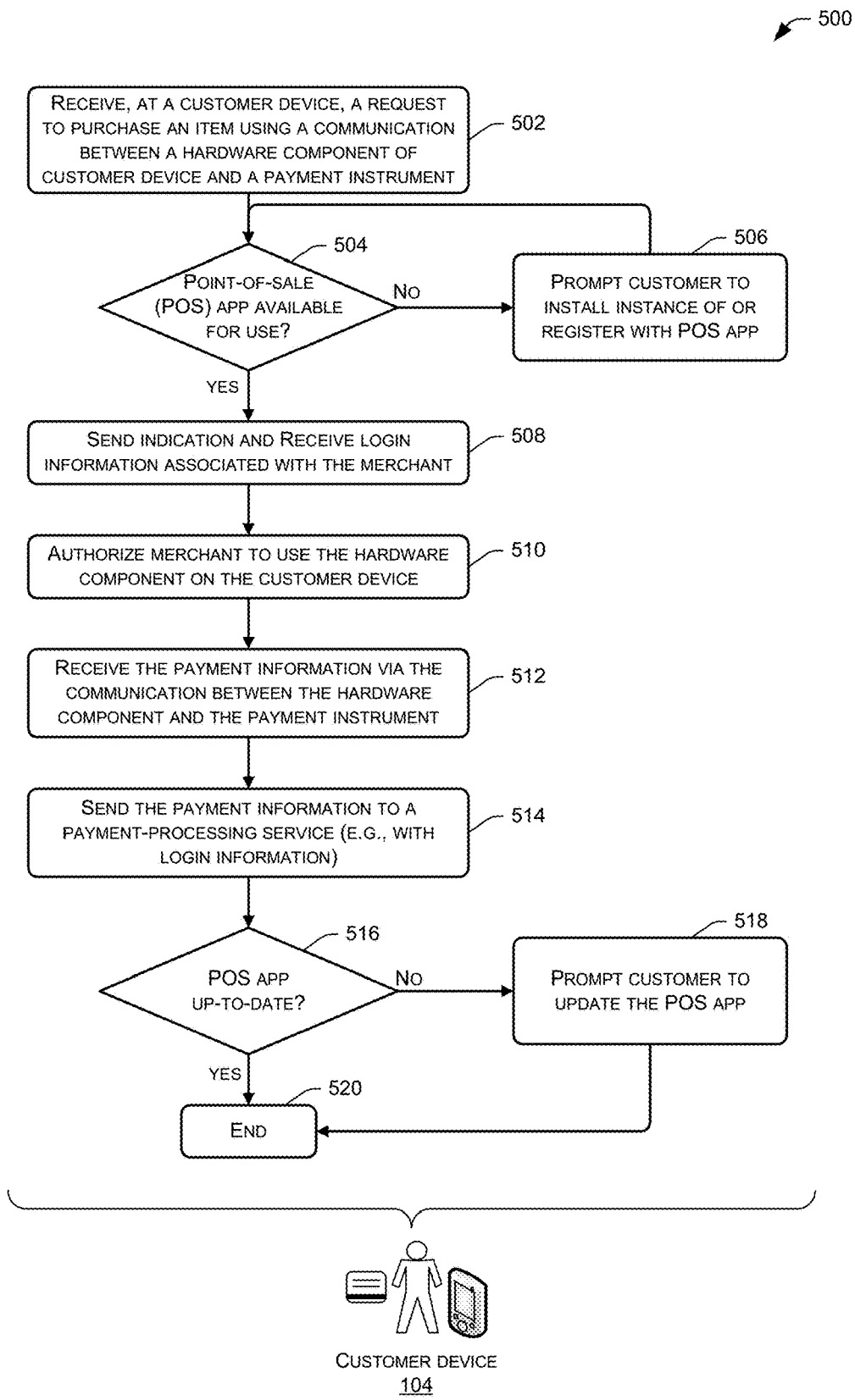
FIG. 5 illustrates an example process that the customer device may implement in response to a customer requesting to complete a transaction using the payment hardware of the customer device.

Upon receiving the login information, the customer device 104 may enable the payment hardware 128, such as the NFC reader, for use. That is, the customer device 104 may authorize the merchant to use the payment hardware 128 to receive payment information from the contactless card of the customer 102. In some instances, the customer device 104 may display an indication requesting that the customer 102 tap his or her contactless card to the device 104. Upon the customer 102 doing so, the NFC reader may receive and store the payment information associated with the card (e.g., number, expiration date, name, etc.) and the device 104 may send this information to the payment-processing service 136, which may use the payment information to authorize purchase of the item for the customer 102. FIGS. 2 and 4-5 and the corresponding discussion describe these techniques in further detail below.

In another example, the customer 102 may instead select the icon 112 to request to purchase the item using the P2P payment application 134. Upon receiving the selection, code on the customer device 104 or at the payment-processing service 136 may initially determine whether the P2P payment application 134 is available for use on the customer device 104. If so, then the P2P payment application 134 may be launched to enable the customer 102 to transfer funds from the linked account of the customer 102 to an account of the merchant 114 to satisfy the cost of the item. If not, however, the risk-calculation component 146 may calculate a risk score associated with a risk of the customer 102 not reimbursing the payment-processing service 136 for the cost of the item(s) if the payment-processing service 136 were to transfer funds to the merchant account on behalf of the customer. The risk-calculation component 146 may then compare this risk score to a risk threshold. If the score is greater than the threshold, then the payment-processing service 136 may refrain from transferring the funds on behalf of the customer and thereafter requesting reimbursement from the customer 102. If, however, the risk score is less than a risk threshold, then the payment-processing service 136 may complete the transaction by transferring funds equal to the cost of the item (including tax, shipping, etc.) to the merchant account and notifying the customer device and the merchant server devices 114 that the transaction has been completed.

After completing the transaction, the payment-processing service 136 may thereafter send a request to the customer device 104 to install and/or register the P2P payment application and transfer funds equal to or otherwise based on the amount of funds previously transferred to the payment-processing service 136 to the merchant 114. FIGS. 3 and 6 and their accompanying description discuss these techniques in further detail below.

FIG. 2 illustrates an example within the architecture of 100 where the customer device 104 enables its payment hardware 128 (e.g., an NFC reader) on behalf of the merchant 114 such that the payment hardware is able to receive payment information from a payment instrument 108 of the customer 102 (e.g., a contactless card) for satisfying a cost of the transaction. While FIG. 2 illustrates one example implementation, it is to be appreciated that other implementations may include more, fewer, and/or different operations.

At "1", code operating on a customer device 104 may determine whether an instance of the POS application 132 is available for use on the customer device 104. This may include determining whether an instance of the application 132 is installed on the device 104, whether the customer has registered with the application 132, and/or the like. In some instances, the customer 102 may have navigated to an ecommerce page 106 of a merchant 114, causing the code to make this determination. If the code determines that the POS application 132 is not available for use, then the device 104 may prompt the customer 102 to install and/or register with the application 132. In some instances, in response to determining that the POS application 132 is available for use, at "2" the ecommerce page 106 of the merchant 114 may display an icon or other indication indicating that the customer 102 may pay for one or more items using a contactless card of the user.

In this example, at "3" the customer 102 selects the icon requesting to purchase an item with a contactless card of the customer 104. At "4", the customer device 104 sends an indication of the request to the payment-processing service 136, which receives the indication of the request at "5". In some instances, this indication is accompanied by information associated with the transaction, such as the identity of the customer 102, the customer device 104, the merchant 114, the cost of the item, and/or the like. At "6", the payment-processing service 136 may determine login information of the merchant based on receiving the request. This may include generating a token and storing an indication at the payment-processing service 136 indicating that the token is associated with the particular transaction. That is, the payment-processing service 136 may store an indication that the generated token authorizes the merchant to use payment hardware 128 on the customer device 104 for the instant transaction with the customer 102, but not for other transactions with other customers. In some instances, the payment-processing service 136 may also store an indication that the token is available for use for a limited amount of time, but not after an expiration time. In other instances, meanwhile, the payment-processing service 136 may retrieve an existing username/password combination or other login information associated with the merchant. At "7", the payment-processing service 136 may associate the login information with the transaction, as discussed above, while at "8" the payment-processing service 136 may send the login information to the customer device 104.

At "9", the customer device 104 may receive the login information and, at "10", may use the login information to enable the payment hardware 128, such as the NFC reader, on the customer device. That is, the customer device 104 may use the login information to authorize the merchant 114 to use the payment hardware 128 on the device 104 for purposes of completing the transaction with the customer 102. At "11", the customer device 104 may receive, via the enabled NFC reader in this example, payment information from the contactless card of the customer 102 in response to the customer placing the contactless card in proximity of the NFC reader. At "12", the customer device 104 may send the payment information associated with the contactless card to the payment-processing service 136. In some instances, the customer device 104 may also append or otherwise send along the login information, such as the token associated with the merchant or the transaction.

At "13", the payment-processing service 136 receives the payment information and, potentially, the login information from the customer device. At "14", the payment-processing service 136 may use the login information to identify the transaction and validate the login information. At "15", the payment-processing service 136 may attempt to authorize the payment using the received the payment information. At "16", in response to receiving an indication that the contactless card has been authorized for the cost of the transaction, the payment-processing service 136 (or another component of a payment network) may transfer funds to an account of the merchant 114. At "17", the merchant 114 may receive an indication that the funds have been transferred, while at "18" the customer device 104 may receive an indication that the transaction has been completed.

FIG. 3 illustrates an example within the architecture 100 where the customer 102 requests to satisfy the cost of the transaction using the P2P payment application 134 prior to the customer installing an instance of the application or otherwise registering with the application. In this example, the payment-processing service 136 pays the merchant 114 on behalf of the customer 102, before requesting that the customer 102 install or register with the P2P payment application 134 and thereafter reimburse the payment-processing service 136 for the cost of the transaction. While FIG. 4 illustrates one example implementation, it is to be appreciated that other implementations may include more, fewer, and/or different operations.

At "1", the customer device 104 receives, from the customer 102, a request to complete a payment transaction using a mobile payment application configured to transfer funds between bank accounts, such as the P2P payment application 134. At "2", the customer device 104 may send a indication of the request to the payment-processing service 136, which receives the indication of the request at "3". At "4", the payment-processing service 136 determines whether the mobile payment application, such as the P2P payment application, available for use at the customer device 104. For example, the payment-processing service 136 may use information identifying the customer, from the indication received from the customer device, to identify a customer profile associated with the customer and may use the customer profile to determine whether the mobile payment application is available for use at the customer device 104. In this example, the payment-processing service 136 determines that the P2P payment application 134 is not available for use at the customer device 104.

At "5", the payment-processing service 136 may determine a risk associated with paying the merchant for the cost of the transaction on behalf of the customer 102 prior to requesting reimbursement from the customer 102. In some instances, the payment-processing service 136 may calculate a risk score based on information in a customer profile of the customer 102, such as a prior transaction history of the customer 102, and/or the like. In other instances, the payment-processing service 136 may additionally or alternatively calculate this risk score based on a cost of the item(s) being purchased. For example, if the cost of the item(s) is less than a threshold, the payment-processing service 136 may determine that the risk is tolerable and, thus, may front the cost of the transaction for the customer 102. In addition or in the alternative, the payment-processing service 136 may analyze information associated with the merchant, the item being purchases, and/or the like in determining the risk. After calculating the risk score, the payment-processing service 136 may determine whether the score is greater than or less than a risk threshold. In this example, the payment-processing service 136 determines that the risk score is less than the threshold and, thus, that the risk of purchasing the item for the customer 102 is tolerable.

At "6", the payment-processing service 136 transfers first funds from an account of the payment-processing service 136 to an account of the merchant 114 and, at "7", the merchant 114 receives an indication of the transfer. At "8", the customer device 104 receives an indication that the transaction is complete.

At "9", after completing the transaction, the payment-processing service 136 sends a request to the customer device 104 to install and/or register with the P2P payment application 134. At "10", the customer device 104 receives the request and, at "11", receives customer-account information from the customer. This account information may, in some instances, comprise a bank-account information, debit-card information, credit-card information, stored-value information, and/or the like. At "12", the customer device 104 sends the customer-account information to the payment-processing service 136.

At "13", the payment-processing service 136 receives the customer-account information and, at "14", associates the customer-account information with the customer profile of the customer 102. At "15", after receiving consent from the customer 102, the payment-processing service 136 initiates a transfer of second funds from the customer account to the payment-processing-service account. The second funds may be equal to or otherwise based on the amount of the first funds. At "16", the payment-processing service 136 sends an indication of the transfer of the second funds to the customer device 104, which receives the indication at "17".

FIGS. 4-6 are flow diagrams illustrating example processes according to some implementations. The processes of FIGS. 4-6 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 4-6 can be combined with some or all of the operations illustrated in others of FIGS. 4-6. For discussion purposes, the processes are described with reference to the environments, architectures and devices described in FIGS. 1-3 above, although the processes can be implemented in a wide variety of other environments, architectures and devices.

FIG. 4 illustrates an example process 400 that the payment-processing service 136 may implement for causing a customer device 104 to enable its payment hardware 128 for receiving payment information from a payment instrument 108 of a customer 102 for satisfying a cost of a transaction between the customer 102 and a merchant 102. While this process 400 is described as being performed by the payment-processing service 136, in some instances some or all of the operations may be performed by the customer device 104 and/or other components.

At an operation 402, the payment-processing service 136 may receive a request from a customer device to purchase an item using a communication between a hardware component of the customer device and a payment instrument of the customer. The hardware component may comprise an NFC reader that reads payment information from a contactless card, a card reader that reads payment information based on a payment instrument being swiped or dipped, or the like. At an operation 404, the payment-processing service 136 determines whether the POS application 132 is available for use at the customer device 104. If not, then at an operation 406 the payment-processing service 136 may prompt the customer 102 to install an instance of the POS application 132 and/or register with the POS application. After the customer 102 does so, or after determining that the POS application is available for use, at an operation 408 the payment-processing service 136 may generate and/or retrieve login information associated with the merchant. At an operation 410, the payment-processing service 136 may store an association between the login information (e.g., a generated token) and the request. At an operation 412, the payment-processing service 136 sends the login information to the customer device 104.

At an operation 414, the payment-processing service 136 receives payment information that was acquired by the POS application 132 via the communication between the hardware component of the customer device 104 and the payment instrument of the customer 102. For example, the customer device 104 may have enabled the hardware component in response to receiving the login information and, thus, may have acquired the payment information from a swiped, inserted, or tapped payment instrument. At an operation 416, the payment-processing service 136 may attempt to authorize the transaction using the received payment information.

After attempting to authorize the payment transaction, the payment-processing service 136 may determine whether the instance of the POS application 132 stored on the customer device 104 is up-to-date. That is, the payment-processing service 136 may determine whether the version of the POS application 132 stored on the customer device is a most current version available. If not, then at an operation 420 the payment-processing service 136 may prompt the customer 102 to update the POS application 132. If the current instance is up-to-date, then the process 400 may end at an operation 422. It is to be appreciated, however, that the process 400 may, in this example, complete the payment transaction prior to requesting that the customer 102 update the POS application, this avoiding the situation where an update request interrupts a payment transaction.

FIG. 5 illustrates an example process 500 that the customer device 104 may implement in response to a customer 102 requesting to complete a transaction using the payment hardware 128 of the customer device 104. While this process 500 is described as being performed by the customer device, in some instances some or all of the operations may be performed by the payment-processing service 136 and/or other components.

At an operation 502, the customer device 104 receives a request to purchase an item from a merchant 114 using a communication between a hardware component of the customer device 104 and a payment instrument 108 of the customer. The hardware component may comprise an NFC reader that reads payment information from a contactless card, a card reader that reads payment information based on a payment instrument being swiped or dipped, or the like. At an operation 504, the customer device 504 may determine whether the POS application 132 is available for use. If not, then at an operation 506 the customer device 104 may prompt the customer 102 to install and/or register with the POS application 132. After the customer 102 does so, or after determining that the POS application 132 is available for use, at an operation 508 the customer device 104 may send an indication of the request to the payment-processing service 136 and receive, from the payment-processing service 136, login information associated with the merchant for enabling the hardware component.

At an operation 510, the customer device 104 authorizes the merchant to use the hardware component of the customer device and, at an operation 512, the customer device 104 receives the payment information via the communication between the hardware component and the payment instrument. At an operation 514, the customer device 104 sends the payment information to the payment-processing service 136, potentially along with the login information associated with the merchant. At an operation 516, after sending the payment information for completing the transaction to the payment-processing service 136, the customer device 104 may determine whether the instance of the POS application 132 stored on the customer device 104 is up-to-date. That is, the customer device 104 may determine whether the version of the POS application 132 stored on the customer device 104 is a most current version available. If not, then at an operation 518 the customer device 104 may prompt the customer 102 to update the POS application 132. If the current instance is up-to-date, then the process 500 may end at an operation 520. It is to be appreciated, however, that the process 500 may, in this example, complete the payment transaction prior to requesting that the customer 102 update the POS application, this avoiding the situation where an update request interrupts a payment transaction.

FIG. 6 illustrates an example process 600 that the payment-processing service 136 may implement in response to a customer 102 requesting to complete a transaction using a P2P payment application 134 prior to the customer 102 installing or registering with the application 134. While this process 600 is described as being performed by the payment-processing service 136, in some instances some or all of the operations may be performed by the customer device 104 and/or other components.

At an operation 602, the payment-processing service 136 receives, from a customer device 104, a request to purchase an item from a merchant using a mobile application configured to transfer funds between bank accounts, such as between customer accounts, between a customer account and a merchant account, and the like. At an operation 604, the payment-processing service 136 determines whether the mobile application is available for use. That is, the payment-processing service 136 may determine whether the customer device 104 has installed an instance of the mobile application (e.g., the P2P payment application 134), whether the customer 102 has registered with the mobile application (e.g., linked a bank account with the application), or the like. If the mobile application is available, then at an operation 606 the payment-processing service 136 may initiate transfer of funds from the linked customer account to the merchant account to satisfy the cost of the transaction.

If the mobile application is not available for use at the customer device 104, however, at an operation 608 the payment-processing service 136 may calculate a risk associated with the paying for the transaction on behalf of the customer 102 and determine whether this risk is less than a risk threshold. That is, the payment-processing service 136 may determine the risk of the customer 102 not reimbursing the payment-processing service 136 if the payment-processing service 136 were to pay the merchant on behalf of the customer 102 and thereafter request reimbursement. If the risk score is not tolerable, that is not less than the risk threshold, then at an operation 610 the payment-processing service 136 may decline the request to purchase the item using the mobile application.

If the risk score is tolerable, however, then at an operation 612 the payment-processing service 136 may transfer first funds from an account of the payment-processing service 136 to the merchant account to complete the transaction between the customer 102 and the merchant 114. At an operation 614, and after paying for the item on behalf of the customer 102, the payment-processing service 136 may request that the customer install and/or register with the mobile payment application. After the customer 102 does so, the payment-processing service 136 may receive customer-account information at an operation 616 and, at an operation 618, may associate the customer-account information with the instance of the mobile application installed on the customer device 104. Thus, the customer 102 may thereafter use the mobile application to transfer funds to other merchants, customers, and/or the like. In addition, after associating the customer-account information with the mobile application, at an operation 620 the payment-processing service 136 may initiate transfer of second funds from the customer account to the payment-processing-service account to reimburse the payment-processing service 136 for the payment of the first funds to the merchant account.

At an operation 622, after the payment-processing service 136 may determine whether the instance of the mobile application stored on the customer device 104 is up-to-date. That is, the payment-processing service 136 may determine whether the version of the mobile application stored on the customer device 104 is a most current version available. If not, then at an operation 624 the payment-processing service 136 may prompt the customer 102 to update the mobile application. If the current instance is up-to-date, then the process 600 may end at an operation 626. It is to be appreciated, however, that the process 600 may, in this example, complete the transfer of the first and second funds prior to requesting that the customer 102 update the mobile application, this avoiding the situation where an update request interrupts a payment transaction.

Figure 7:
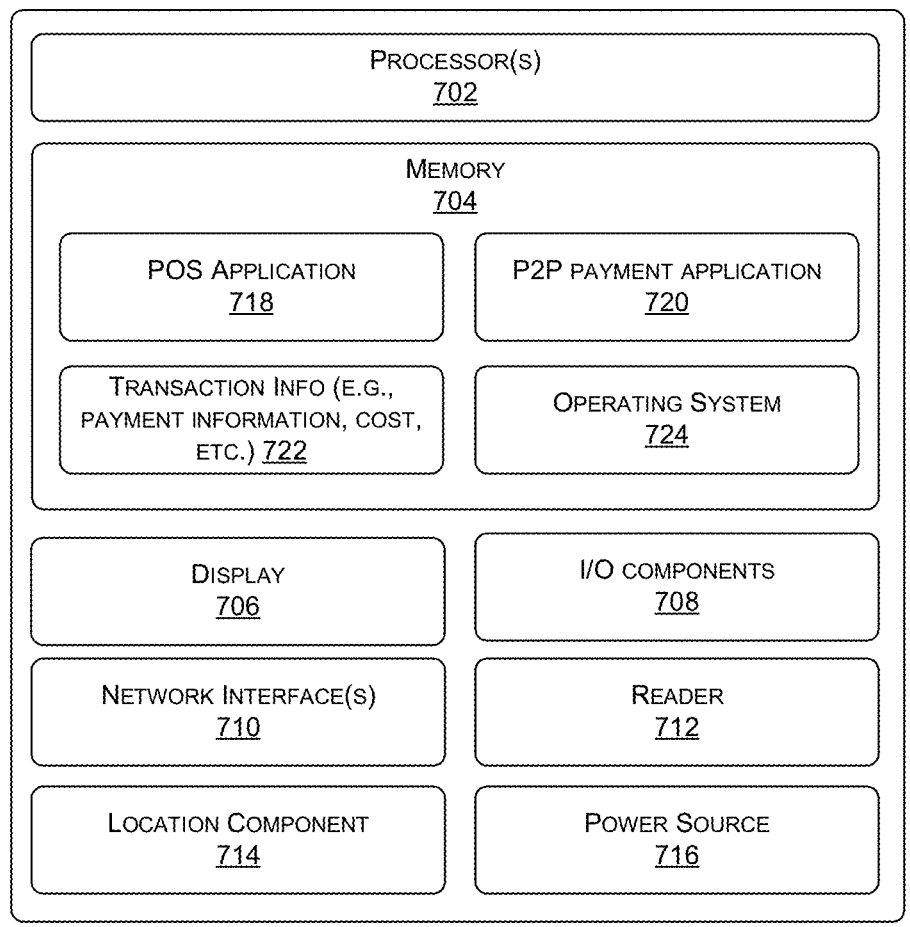
FIG. 7 illustrates example components of a customer device that may be configured to acts as a POS device, as described herein.

FIG. 7 illustrates example components of the customer device 104 that may be configured to act as a POS device, as described herein. The customer device 104 may be any suitable type of computing device, e.g., mobile, semi-mobile, semi-stationary, or stationary. Some examples of the customer device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the customer device 104 includes at least one processor 702, memory 704, a display 706, one or more input/output (I/O) components 708, one or more network interfaces 710, at least one card reader 712, at least one location component 714, and at least one power source 716. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the memory 704.

Depending on the configuration of the customer device 104, the memory 704 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 704 may include, but is not limited to, RAM, ROM, EEPROM, flash memory, solid-state storage, magnetic disk storage, optical storage, and/or other computer-readable media technology. Further, in some cases, the customer device 104 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702. Further, when mentioned, non-transitory computer-readable media exclude media such as energy, carrier signals, electromagnetic waves, and signals per se.

The memory 704 may be used to store and maintain any number of functional components that are executable by the processor 702. In some implementations, these functional components comprise instructions or programs that are executable by the processor 702 and that, when executed, implement operational logic for performing the actions and services attributed above to the customer device 104. Functional components of the customer device 104 stored in the memory 704 may include a POS application 718, which may be similar or the same as the POS application 132 discussed above. The POS application 718 may present an interface on the customer device 104 to enable the customer 102 and/or the merchant 114 to conduct transactions, receive payments, and so forth, as well as communicating with the payment service 136 for processing payments and sending transaction information. In addition, the memory 704 may include a P2P payment application 720, which may be same as or similar to the P2P payment application 134 described above. Additional functional components may include an operating system 724 for controlling and managing various functions of the customer device 104 and for enabling basic user interactions with the customer device 104. The memory 704 may also store transaction information/data 722 that is received based on the customer and/or merchant engaging in various transactions, such as the transactions discussed above.

In addition, the memory 704 may also store data, data structures and the like, that are used by the functional components. For example, this data may include item information that includes information about the items offered by the merchant, which may include images of the items, descriptions of the items, prices of the items, and so forth. Depending on the type of the customer device 104, the memory 704 may also optionally include other functional components and data, which may include programs, drivers, etc., and the data used or generated by the functional components. Further, the customer device 104 may include many other logical, programmatic and physical components, of which those described are merely examples that are related to the discussion herein.

The network interface(s) 710 may include one or more interfaces and hardware components for enabling communication with various other devices over the network or directly. For example, network interface(s) 710 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 7 further illustrates that the customer device 104 may include the display 706 mentioned above. Depending on the type of computing device used as the customer device 104, the display 706 may employ any suitable display technology. For example, the display 706 may be a liquid crystal display, a plasma display, a light emitting diode display, an OLED (organic light-emitting diode) display, an electronic paper display, or any other suitable type of display able to present digital content thereon. In some examples, the display 706 may have a touch sensor associated with the display 706 to provide a touchscreen display configured to receive touch inputs for enabling interaction with a graphic interface presented on the display 706. Accordingly, implementations herein are not limited to any particular display technology. Alternatively, in some examples, the customer device 104 may not include the display 706, and information may be presented by other means, such as aurally.

The I/O components 708, meanwhile, may include speakers, a microphone, a camera, various user controls (e.g., buttons, a joystick, a keyboard, a keypad, etc.), and/or a haptic output device, and so forth.

In addition, the customer device 104 may include or may be connectable to one or payment instrument reader 712, which may be same or similar as the payment hardware 128 discussed above. In some examples, the reader 712 may comprise an NFC reader integral with or communicatively coupled to the customer device 104 may plug in to a port in the merchant device, such as a microphone/headphone port, a data port, or other suitable port. In other instances, the reader 712 is integral with the entire customer device 104. The reader may include a read head for reading a magnetic strip of a payment card, and further may include encryption technology for encrypting the information read from the magnetic strip. Alternatively, numerous other types of card readers may be employed with the POS devices 700 herein, depending on the type and configuration of a particular Customer device 104.

The location component 714 may include a GPS device able to indicate location information, or the location component 714 may comprise any other location-based sensor. The customer device 700 may also include one or more additional sensors (not shown), such as an accelerometer, gyroscope, compass, proximity sensor, and the like. Additionally, the customer device 700 may include various other components that are not shown, examples of which include removable storage, a power control unit, and so forth.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Furthermore, the foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising
   displaying an ecommerce page of a merchant on a customer device;
   receiving an indication that a customer operating the customer device has requested to complete a payment to the merchant using a mobile application configured to transfer funds between accounts;
   determining that the mobile application is not installed on the customer device;
   determining a risk of nonpayment associated with the customer, wherein the risk of nonpayment is based at least in part on a prior transaction history associated with at least one of the merchant at a payment-processing service or the customer at the payment-processing service;
determining that the risk of nonpayment satisfies a risk threshold;
transferring, based at least in part on determining that the mobile application is not installed on the customer device and the risk of nonpayment satisfying the risk threshold, first funds from an account of the payment-processing service to an account of the merchant to satisfy the payment by the payment-processing service on behalf of the customer, wherein the account of the payment-processing service is unrelated to the merchant;
based at least in part on transferring the first funds to satisfy the payment by the payment-processing service on behalf of the customer:
    causing a request to be displayed on the customer device, the request to install an instance of the mobile application on the customer device;
    associating, in response to an indication that the instance of the mobile application has been installed, an account of the customer with the instance of the mobile application; and
    transferring, based at least in part on the indication that the instance of the mobile application has been installed and to reimburse the payment-processing service for the payment made to the merchant on behalf of the customer, second funds from the account of the customer to the account of the payment-processing service;
receiving, from the customer device and at the payment-processing service, a request to transfer additional funds from the account of the customer to an additional account associated with an additional customer via the instance of the mobile application; and
transferring the additional funds from the account of the customer to the additional account of the additional customer.

2. The method as recited in claim 1, wherein the risk of nonpayment is based at least in part on at least one of customer information associated with a customer profile maintained by the payment processing service or a cost of an item.

3. The method as recited in claim 1, wherein:
the determining comprises determining that the instance of the mobile application is not installed on the customer device; and
the requesting comprises requesting that the customer install the instance of the mobile application on the customer device.

4. The method as recited in claim 1, further comprising:
at least partly before the transferring of the first funds:
    determining a cost of an item at the merchant; and
    determining that the cost of the item satisfies a cost threshold; and
wherein the transferring the of the first funds comprises transferring the first funds based at least in part on determining that the cost of the item satisfies the cost threshold.

5. A system comprising:
one or more processors; and
one or more computer-readable media storing computer-executable instructions that, when executed, cause one or more processors to perform operations comprising:
    receiving, from a customer device associated with a customer, a request to complete a payment to a merchant using a mobile application configured to transfer funds between accounts;
    determining that at least one of an instance of the mobile application is not installed on the customer device or the customer has not registered with the mobile application;
    determining a risk of nonpayment associated with the customer, wherein the risk of nonpayment is based at least in part on a prior transaction history associated with at least one of the merchant at a payment-processing service or the customer at the payment-processing service;
    determining that the risk of nonpayment satisfies a risk threshold;
    transferring, based at least in part on determining that the at least one of the instance of the mobile application has not been installed on the customer device or the customer has not been registered with the mobile application and the risk of nonpayment, first funds from an account associated with the payment-processing service to an account associated with the merchant to satisfy the payment by the payment-processing service on behalf of the customer, wherein the account associated with the payment-processing service is unassociated with the merchant;
    based at least in part on transferring the first funds to satisfy the payment by the payment-processing service on behalf of the customer:
        causing a request to be displayed on the customer device, the request to at least one of install the instance of the mobile application on the customer device or register with the mobile application;
        associating an account of the customer with the mobile application; and
        transferring, based at least in part on associating the account of the customer with the mobile application, second funds from the account associated with the customer to the account associated with the payment-processing service, wherein an amount of the second funds is based at least in part on an amount of the first funds;
    receiving, from the customer device and at the payment-processing service, a request to transfer additional funds from the account of the customer to an additional account associated with an additional customer via the instance of the mobile application; and
    transferring the additional funds from the account of the customer to the additional account of the additional customer.

6. The system as recited in claim 5, wherein:
the determining comprises determining that the instance of the mobile application is not installed on the customer device; and
the requesting comprises requesting that the customer install the instance of the mobile application on the customer device.

7. The system as recited in claim 5, wherein the receiving of the request comprises receiving the request to complete payment while the customer device displays an ecommerce page of the merchant.

8. The system as recited in claim 5, the operations further comprising:
at least partly before the transferring of the first funds:
    determining a cost of an item at the merchant; and
    determining that the cost of the item satisfies a cost threshold; and wherein the transferring the of the first funds comprises transferring the first funds based at least in part on determining that the cost of the item satisfies the cost threshold.

9. The system as recited in claim 5,
wherein the transferring of the first funds comprises transferring the first funds based at least in part on determining that the risk of nonpayment satisfies the risk threshold.

10. The system as recited in claim 5, the operations further comprising:
receiving, from the customer device and at least partly after the transferring of the second funds, an additional request to complete payment to an additional merchant using the mobile application;
determining at least one of that the instance of the mobile application is installed on the customer device or that the customer is registered with the mobile application; and
transferring third funds from the account associated with the customer to an account associated with the additional merchant.

11. The system as recited in claim 5, wherein the risk of nonpayment is based at least in part on at least one of customer information associated with a customer profile maintained by the payment processing service or a cost of an item.

12. A method comprising:
receiving, from a customer device associated with a customer, a request to complete a payment to a merchant using a mobile application configured to transfer funds between accounts;
determining that at least one of an instance of the mobile application is not installed on the customer device or the customer has not registered with the mobile application;
determining a risk of nonpayment associated with the customer, wherein the risk of nonpayment is based at least in part on a prior transaction history associated with at least one of the merchant at a payment-processing service or the customer at the payment-processing service;
determining that the risk of nonpayment satisfies a risk threshold;
transferring, based at least in part on the instance of the mobile application not being installed on the customer device or the customer not being registered with the mobile application and the risk of nonpayment, first funds from an account associated with the payment-processing service to an account associated with the merchant to satisfy the payment by the payment-processing service on behalf of the customer, wherein the account associated with the payment-processing service is unassociated with the merchant;
based at least in part on the payment being satisfied by the payment-processing service on behalf of the customer:
causing a request to be displayed on the customer device, the request to at least one of install the instance of the mobile application on the customer device or register with the mobile application;
associating an account of the customer with the mobile application; and
transferring second funds from the account of the customer to the account associated with the payment-processing service, wherein an amount of the second funds is based at least in part on an amount of the first funds
receiving, from the customer device and at the payment-processing service, a request to transfer additional funds from the account of the customer to an additional account associated with an additional customer via the instance of the mobile application; and
transferring the additional funds from the account of the customer to the additional account of the additional customer.

13. The method as recited in claim 12, wherein:
the determining comprises determining that the instance of the mobile application is not installed on the customer device; and
the requesting comprises requesting that the customer install the instance of the mobile application on the customer device.

14. The method as recited in claim 12, wherein the receiving of the request comprises receiving the request to complete the payment while the customer device displays an ecommerce page of the merchant.

15. The method as recited in claim 12, further comprising:
at least partly before the transferring of the first funds:
determining a cost of an item at the merchant; and
determining that the cost of the item satisfies a cost threshold; and
wherein the transferring the of the first funds comprises transferring the first funds based at least in part on determining that the cost of the item satisfies the cost threshold.

16. The method as recited in claim 12,
wherein the transferring of the first funds comprises transferring the first funds based at least in part on determining that the risk of nonpayment satisfies the risk threshold.

17. The method as recited in claim 12, further comprising:
receiving, from the customer device and at least partly after the transferring of the second funds, an additional request to complete payment to an additional merchant using the mobile application;
determining at least one of that the instance of the mobile application is installed on the customer device or that the customer is registered with the mobile application; and
transferring third funds from the account associated with the customer to an account associated with the additional merchant.

18. The method of claim 12, wherein the risk of nonpayment is based at least in part on at least one of customer information associated with a customer profile maintained by the payment processing service or a cost of an item.

* * * * *